3,139,378
METHOD OF MAKING CALCIUM SORBATE

Chester M. Gooding, Westfield, N.J., assignor to Corn Products Company, New York, N.Y., a corporation of Delaware
No Drawing. Filed May 19, 1959, Ser. No. 814,161
3 Claims. (Cl. 167—42)

This invention relates to compounds which are useful for inhibiting the growth of micro-organisms in food products, and also it relates to a method of producing such compounds.

Sorbic acid is presently used for inhibiting microbiological growth in certain kinds of food. It is an excellent fungistat as well as an inhibitor of many pathogenic micro-organisms. However, when sorbic acid is added in the required amounts to certain foods, especially baked goods and soft drinks intended for human consumption, it has been found to introduce an off-flavor, which severely restricts its use. Also sorbic acid, by reason of limited solubility, can be introduced into the foods for which it is suited only in very dilute solutions.

The present invention rests upon the unexpected discovery that, while most of the edible salts of sorbic acid are not sufficiently stable for commercial fungistatic use, calcium sorbate is not only commercially stable but in addition possesses fungistatic and micro-biologically inhibitive capacities equal or superior to those of sorbic acid in certain applications, and in addition, is not of strong odor nor so objectionable to handle while adding required amounts to foods such as baked goods and soft drinks, and has a solubility in water of from about 1% to 1.2% as compared with 0.2% for sorbic acid. It has also been discovered that, when calcium sorbate is made by a process in which sorbic acid and calcium hydroxide are reacted together in aqueous solution with the sorbic acid at least stoichiometrically equal to the hydroxide, the precipitated calcium sorbate is then free from contaminating hydroxide and has the useful properties mentioned. It has also been discovered that, if the sorbic acid is in excess of stoichiometric equality with the hydroxide, the resulting precipitate of calcium sorbate includes admixed sorbic acid which enhances its fungistatic and other useful properties.

Heretofore, it has not been practical to prepare encapsulated sorbic acid in which sorbic acid is coated with a slow-dissolving film of organic material for the reason that in the spray-drying of hot solution of sorbic acid and coating material, much of the sorbic acid, being quite soluble in hot water, remains uncoated. Furthermore, much sorbic acid is lost by evaporation during the process. Still further, the sorbic acid solutions are highly acidic and therefore incompatible with some of the commonly employed enveloping materials. Calcium sorbate, being a neutral and non-volatile substance which remains in discrete particles during the spray-drying process, may be coated with any suitable material, which is compatible with solutions of calcium ions derived from the 1% of calcium sorbate contained in the aqueous vehicle.

Accordingly, an object of this invention is to provide a new and improved fungistat and inhibitor of microbiological growth in foods.

Another object of this invention is to provide a novel method of producing the same.

In accordance with this invention, calcium sorbate with or without added sorbic acid, and with or without an added wetting agent, is employed as a fungistat and microbiological inhibitor in foods. Calcium sorbate can be used at concentrations of about 0.01 to 0.5% by weight based on the total food material, although it is preferred that calcium sorbate be used in a quantity of about 0.025 to 0.3% by weight, on the same basis.

In a particular aspect of this invention calcium sorbate is used in admixture with sorbic acid as the micro-biological inhibitor. The mixture of compounds has particular application to foods which require a relatively high pH for flavor considerations. If sorbic acid were used alone, flavor would not be as good as desired. Consequently, by replacing part of the sorbic acid with calcium sorbate, the required inhibiting action is produced without any sacrifice in flavor. Carbonated beverages or soft drinks are examples of foods whose flavors are susceptible to changes in pH. Generally, the mixture of inhibitors is used in foods in which the pH may be adjusted to about 5.5 or slightly lower. In general, the mixture of inhibitors consists of from about 0.05 to 1 part of sorbic acid to one part of calcium sorbate, on a weight basis.

The above described mixture can be prepared by adding together the calcium sorbate and sorbic acid, each in the form of a finely divided solid, with sufficient agitation to effect a thorough intermingling. However, the method of preparing calcium sorbate using an excess of sorbic acid over the amount stoichiometrically equal to the calcium hydroxide used in the reaction, is the preferred way of making the above described mixture.

Calcium sorbate by itself, or a mixture thereof with sorbic acid as described above, inhibits the growth of various types of micro-organisms including many pathogenic and non-pathogenic types of bacteria. It is effective in inhibiting the growth of such pathogenic micro-organisms as Salmonella, Staphylococcus and certain Streptococcus. It is also an effective inhibitor of non-pathogenic micro-organisms such as molds, fungi, yeast, etc. It can be used in a variety of foods including cakes, bread, pies, cheese, jams, jellies, chocolate syrup, etc. In view of its physical characteristics, it is especially useful as a preservative in baked goods and particularly in yeast-raised baked goods when the calcium sorbate is coated with a protective film as described above.

According to the present invention, the calcium salt of sorbic acid is prepared by reacting calcium hydroxide with sorbic acid. In the reaction the acid is present in at least the stoichiometric amount required to react with all of the calcium hydroxide present. When it is desired to produce a calcium salt containing sorbic acid, the sorbic acid is fed to the reaction in excess of the stoichiometric amount, preferably about 1.05 to about 2 times such amount. The mixture of calcium salt and acid may have a pH of about 3 to 6. The low pH can also be obtained by adding to the mixture another acid, for example, malic, succinic, lactic, citric or tartaric acid. The reaction is conducted at a temperature of about 20° C. to about 80° C. The pressure of reaction is not important and can be varied within wide limits. It is preferred that the reaction be conducted at essentially atmospheric pressure or just above atmospheric pressure to accommodate any pressure drop resulting from the flow of materials to and from the reaction zone. For a commercial production of the calcium salt the pressure can range from about 5 to about 25 p.s.i.g. The reaction is conducted as a batch, semi-continuous or continuous operation. The residence time of the reactants is controlled to effect complete reaction of calcium hydroxide.

Although both calcium hydroxide and sorbic acid are soluble in water to only a limited degree, sorbic acid has greater solubility in water than calcium hydroxide, especially when the reaction solution is heated. This means that as the calcium salt is produced, sorbic acid is always present in excess during the formation of the salt. The calcium hydroxide gradually dissolves and combines with the small amount of dissolved sorbic acid. In effect, two very sparingly soluble reactants thus are caused to combine to form about a 1% solution of calcium sorbate. When the medium is saturated with calcium salt the latter is crystallized from solution. The reaction between the acid and calcium hydroxide is conducted with agitation so that the conditions are conducive to nucleation of crystalline calcium sorbate. The reaction medium, preferably aqueous, is saturated with calcium sorbate at the end of the reaction period. At this time it is also substantially free of calcium hydroxide. The concentration of sorbic acid will depend on the amount of acid which is charged to the system. Any excess above the stoichiometric amount will be present in the final reaction mass.

In a batch operation the entire reaction mass is subjected to a separation treatment for the recovery of calcium sorbate crystals which are suspended in the mass. After separating calcium sorbate crystals, the mother liquor is reused for additional production of calcium sorbate. In a continuous or semi-continuous operation a portion of the reaction mass is continuously or intermittently withdrawn and subjected to a separation treatment for the recovery of solid calcium sorbate. The remaining liquor is recycled to the reaction zone. Any loss of liquor in the separation treatment is replenished continuously or periodically to the reaction zone. In the continuous or semi-continuous operation the reactor is designed for continuous passage of reactants so that at any point of travel the concentration of calcium hydroxide can be correlated with the time of reaction. In other words, when the reaction mass is about to leave the reactor, substantially all or all of the calcium hydroxide has been consumed so that no separation problem is created in the recovery of calcium sorbate free of calcium hydroxide. In general, in a batch process, the time of reaction is about 15 minutes to about 1½ hours, more usually about 45 minutes to about 1 hour. In the continuous process, the time of reaction is somewhat shorter and is dependent upon the rate of solution of calcium hydroxide as affected by the rate of addition of ingredients, temperature and degree of agitation.

Since dry calcium sorbate is difficult to wet with water, and hence hard to get into solution, it is preferred to add to the calcium sorbate a small amount of an edible wetting agent. Many edible wetting agents are known, and any of these may be selected. In general, the wetting agent must be compatible with solutions containing calcium ions and therefore are usually of the class of non-ionic or cationic wetting agents. However, certain sulfonated, anionic wetting agents are also useful. A convenient place to add the wetting agent is during the precipitation of the calcium sorbate. According to this preferred form of the invention, from about 0.05% to about 2% of a wetting agent, such as polyoxethylene derivative of sorbitan mono stearate, di-isobutyl phenoxy ethoxy-ethyl dimethyl benzyl ammonium chloride and sodium alkyl aryl sulfonate and oxy ethylene derivatives thereof, is added to the aqueous medium from which the calcium sorbate is to be precipitated, and sufficient wetting agent then remains on the separated product to provide a surface coating of wetting agent on the dried particles of calcium sorbate. Calcium sorbate so prepared retains on its surface about 1/10 of the mother liquor when prepared as described above, and thus the amount of wetting agent on the finished dried calcium sorbate is very much less than used in the reaction and is related to the extent to which mother liquor is removed prior to drying.

To provide a better understanding of the invention, reference will be had to the following specific example.

224 pounds of sorbic acid was suspended in 4,000 pounds of water containing 5 pounds of diisobutylcresoxy-ethoxyethyl dimethylbenzyl ammonium chloride. To the stirred mixture over the course of about 1 hour was added 74 pounds of hydrated lime. Since the reaction mixture was acidic at this point another 2 pounds of lime was added to obtain a pH of 9.5. After 2 hours of continued stirring, during which time the pH of the reaction mixture remained constant, additional sorbic acid was added to the batch in 1 pound increments until a pH of 5.7 was attained. Continued stirring for 20 minutes did not alter the pH of 5.7. The calcium sorbate was then filtered by continuous centrifugal filtration and the cake was tunnel-dried and broken down to a fine flour-like product by passing the dried material through a screening process.

Having thus described the invention and set forth a specific example of the preferred form thereof, it is pointed out that this specification is to be taken by way of illustration and not of limitation, and that the invention is defined by the appended claims.

What is claimed is:

1. The method of producing calcium sorbate which comprises reacting a suspension of calcium hydroxide and a suspension of sorbic acid in an aqueous medium, the amount of sorbic acid being at least the stoichiometric quantity required to react with all of the calcium hydroxide, permitting the reaction to proceed until all of the calcium hydroxide has been reacted, and separating particulate calcium sorbate from the reaction mass substantially free of calcium hydroxide.

2. The method of producing calcium sorbate which comprises reacting a suspension of calcium hydroxide and a suspension of sorbic acid in an aqueous medium, the amount of sorbic acid being from about 1.05 to about 2 times the stoichiometric quantity required to react with all of the calcium hydroxide, permitting the reaction to proceed until all of the calcium hydroxide has been reacted, and separating particulate calcium sorbate from the reaction mass substantially free of calcium hydroxide.

3. The method of producing particulate calcium sorbate coated with a wetting agent which comprises reacting a suspension of calcium hydroxide and a suspension of sorbic acid in an aqueous medium containing dissolved wetting agent, the amount of sorbic acid being at least the stoichiometric quantity required to react with all of the calcium hydroxide, permitting the reaction to proceed until all of the calcium hydroxide has been reacted, and separating from the reaction mass particulate calcium sorbate substantially free of calcium hydroxide and coated with the wetting agent.

References Cited in the file of this patent

UNITED STATES PATENTS

| | | |
|---|---|---|
| 2,033,909 | Cox et al. | Mar. 17, 1936 |
| 2,379,294 | Gooding | June 26, 1945 |
| 2,550,256 | Jensen | Apr. 24, 1951 |
| 2,711,976 | Castellani | June 28, 1955 |
| 2,838,561 | Fisher et al. | June 10, 1958 |

OTHER REFERENCES

Frear: Chemistry of Insecticides, Fungicides and Herbicides, 2nd ed., 1948, pages 277–287.

Organic Chemistry, College Outline Series, 6th ed., 1953, p. 91.